R. B. BENJAMIN.

PLURAL LAMP SOCKET.

APPLICATION FILED FEB. 23, 1909.

Reissued Mar. 30, 1909.

12,931.

2 SHEETS—SHEET 1.

Witnesses:-
Ubu S. H. Yagle
Charles L. Hopkins

Inventor:-
Reuben B. Benjamin,
by Jones, Addington & Ames,
Atty's.

R. B. BENJAMIN.
PLURAL LAMP SOCKET.
APPLICATION FILED FEB. 23, 1909.
Reissued Mar. 30, 1909.
12,931.
2 SHEETS—SHEET 2.
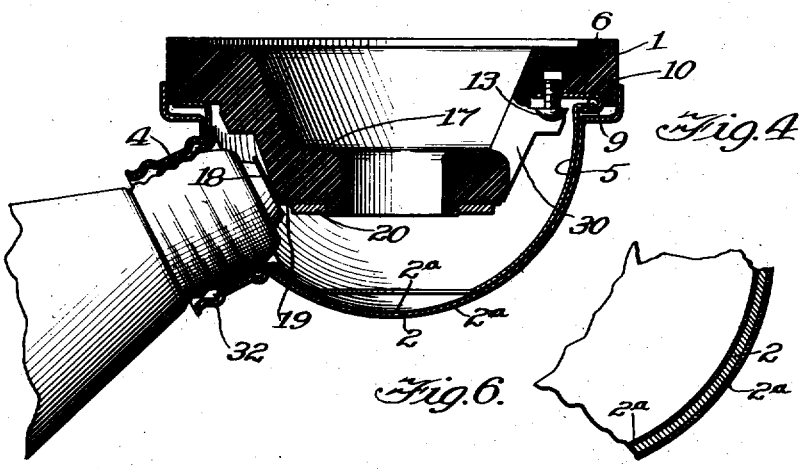
Fig. 4
Fig. 6.
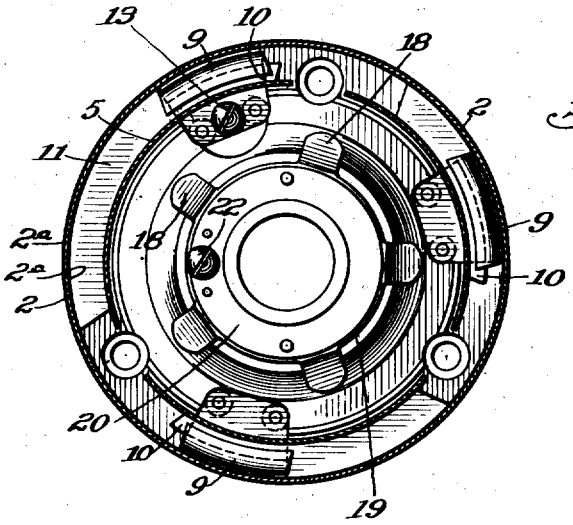
Fig. 5.
Witnesses:-
Ubne H. Yagle
Charles L. Hopkins
Inventor:-
Reuben B. Benjamin,
by Jones, Addington & Ames,
Atty's.

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

PLURAL LAMP-SOCKET.

No. 12,931. Specification of Reissued Letters Patent. Reissued Mar. 30, 1909.

Original No. 912,529, dated February 16, 1909, Serial No. 328,078. Application for reissue filed February 23, 1909. Serial No. 479,675.

*To all whom it may concern:*

Be it known that I, REUBEN B. BENJAMIN, a citizen of the United States, residing at Chicago, in the county of Cook and State of Illinois, have invented new and useful Improvements in Plural Lamp-Sockets, of which the following is a full, clear, concise, and exact description, reference being had to the accompanying drawing, forming a part of this specification.

My invention relates to improvements in plural lamp sockets, one of the objects of my invention being to provide a socket in which the cover or inclosing casing may be readily removed to afford access to the binding posts of the device and to the screws or the like by which the socket is secured in position.

In sockets which have been in commercial use heretofore, it has been necessary, in removing the cover thereof for the purpose of gaining access to the binding posts of the device, to remove from each of the threaded shells of the socket a bushing by which the cover is supported, and it is one of the objects of my present invention to provide a socket in which access to the binding posts may be obtained with the smallest expenditure of time and effort.

Another object of my invention is to provide a socket which may be readily assembled and which will permit ready access to the various parts of the device for the purpose of repair, etc.

Still another object is the provision of means in connection with a plural lamp socket, whereby the amount of light desired may be conveniently obtained by switching in or out of service either a single central lamp or a group of lamps in a circle, or all of the lamps combined.

Figure 1:
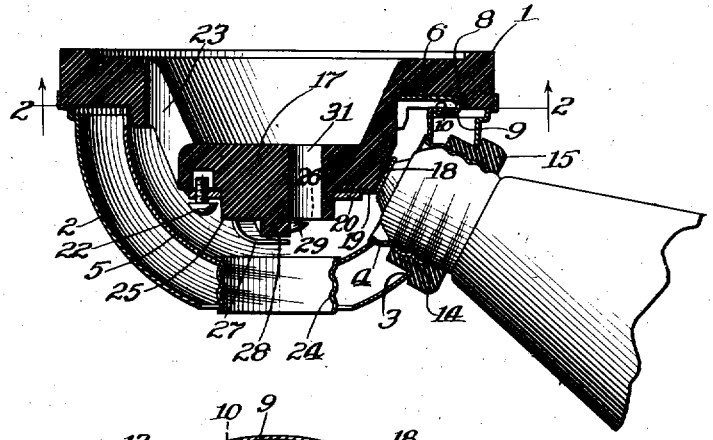
Figure 2:
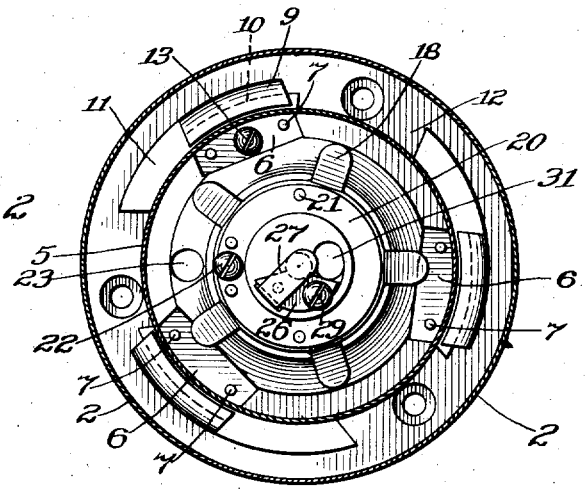
Figure 3:
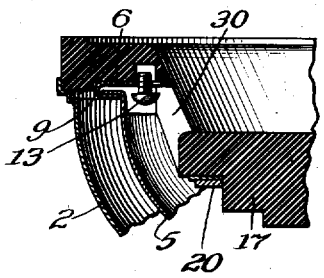

Two of the structures which I have worked out as embodying the above characteristics are illustrated in the accompanying drawings, in which, Figure 1 is a sectional elevation of one form of my invention; Fig. 2 is an inverted plan view of the base with the cover and one contact plate in section on the line 2—2 of Fig. 1; Fig. 3 is a detail section showing the manner in which one of the binding posts of the cluster is mounted; Fig. 4 is a sectional view of a modification of my invention; Fig. 5 is a bottom plan view of the base of the modified form of device, the cover and contact plate thereof being in section; and Fig. 6 is an enlarged section of a portion of the casing employed in this form of the device.

In accordance with my invention, I provide a suitable basic or supporting part 1, which may be of any suitable form, but in the present instance takes the form of an insulating base of porcelain, and coöperating with this base or supporting part, I provide a metallic casing or cover 2, detachably connected therewith, and having a plurality of lamp openings 3. Registering with these lamp openings I provide a plurality of lamp holding devices 4, which, in the present instance, are in the form of threaded shells, and are carried upon and removable with a contact plate 5. This contact plate is removably connected with the basic or supporting part 1, by means of a detachable connection consisting of clips 6 suitably secured upon the supporting part 1 by means of screws 7, and set in recesses 8 formed in said supporting part, whereby the inturned portion 9 of the clip will be almost flush with the lower face of the supporting part 1. Coöperating with these clips is an out-turned flange formed upon the upper part of the contact-plate 5, and having a portion 10 thereof adapted to engage behind the inturned portion 9 of the clips, and a portion 11 slightly larger than the portion 10 which forms a stop to prevent the portion 10 from being rotated past the engaging point. At 12, the flange is entirely cut away to permit the contact plate at this point to pass the projections or inturned portions 9 of the clips, whereby when the plate is placed in position, and slightly rotated, the portion 10 of the flange thereof will engage behind the inturned portion 9 of the supporting clips and maintain the plate in position. One of the supporting clips 6 is provided with a binding post 13, which in this instance is in the form of a screw secured thereon, to which one of the supply wires may be secured.

The cover 2 is carried by and removable with the contact plate 5, and for connecting the two together, I provide in one form of the device insulating bushings 14, which pass through the openings 3 in the cover and screw upon the threaded shells 4, and are provided with flanges 15 adapted to engage the walls of the casing 2. By this means, the casing is not only connected to and supported by the threaded shells and the contact plate 5, but the threaded shells are also insulated from the metallic casing.

The center contacts for the lamps are mounted within the casing 2, and register with the lamp holding devices or sockets 4. These center contacts are preferably mounted upon an insulating member 17, forming in the present instance, a part of the basic or supporting member 1. The center contacts are in the form of upturned lugs 18 formed upon a metallic ring 19, secured upon the front face of the insulating member 17, and held in position by means of a metallic ring 20 which in turn is secured upon the insulating member 17 by means of screws 21. This ring 20 carries a binding post 22, which in the present instance is in the form of a screw, suitably secured thereon, to which one of the supply wires of the circuit may be secured, an opening 23 being formed in the insulating member 17 for the passage of the wire.

In addition to the series of threaded lamp shells 4, which, it will be noted, are arranged concentrically around the insulating member 17, I provide a central depending threaded lamp shell 24, also secured to the contact plate 5. The center lamp contact for this receiving shell is mounted upon the front face of a projection 25 formed on the insulating member 17, and comprises a plate 26 having a portion 27 thereof, bent back upon itself, and over a projection 28 on the insulating member 17 to form a spring center contact for the depending lamp secured in the threaded shell 24. The depending or center lamp may be arranged to be lighted with the rest of the lamps if so desired, in which case the contact plate 26 would be connected directly with the ring 20, but in the present instance, it is shown as having an independent binding post in the form of a screw 29 to which a supply wire may be secured, whereby the central lamp may be connected to be lighted independently of the remaining lamps of the cluster.

By the above described construction, it will be noted that the casing or covering is carried by the lamp supporting means, which is in turn removably mounted upon the basic or supporting part of the lamp socket. When the lamp supporting means and the inclosing cover are removed from position, the various binding posts of the cluster are exposed and may be readily connected to the supply wires. An opening 30 is formed in the insulating member 17 through which the conductor for the binding post 13 may pass and the openings 23 and 31 permit the supply wires for the binding posts 22 and 29 to be led thereto. After the supply wires have been suitably connected to their binding posts, the contact plate and cover may be readily secured in position by first placing the same upon the base in a position in which the openings 12 in the flange of the contact plate register with the clips 6. Then, by rotating the contact plate, the portions 10 of the flange will be caused to pass behind and engage with the inturned portions 9 of the clips 6, the portions 11 of the flange forming stops to prevent the contact plate from being rotated too far.

It will also be noted that all of the binding posts are mounted upon the basic or supporting part of the cluster and that when the casing is secured in place communication is established between the binding-post 13 and the outer lamp-engaging contacts through the parts which constitute the separable connection between the basic part and the contact plate 5.

In the modification of my invention shown in Figs. 4 and 5, the cover shown therein is formed of metal having a covering of fictile material 2[a], such as porcelain-enamel or the like, and is provided with sleeves 32 into which the threaded shells 4 of the cluster project. By the provision of the porcelain-enamel upon the cover the contact plate 5 may lie in close engagement with the cover without danger of short circuits or the like, the fictile material forming a perfect insulation between the contact plate and the metallic portion of the cover. In this construction I have dispensed with the use of the threaded bushings as the contact plate 5 lying in close engagement with the cover 2 and the threaded shells 4 projecting into the sleeves 32 of the cover serve to readily support the cover in position. The construction of the remaining parts of the form shown in the modification is the same as illustrated in Figs. 1, 2 and 3, with the exception that I have not shown in this modification the central lamp feature. This feature may, however, be used if so desired.

While in the present application I have shown certain forms of my invention, it will be understood that I do not wish to be limited to the construction shown, as various changes and modifications may be made without departing from the spirit of my invention, as set forth in the appended claims.

Having thus described my invention, what I claim as new and desire to secure by Letters Patent, is:

1. In a plural lamp socket, the combination with a basic or supporting part, of lamp-engaging contacts carried thereby, a pair of shells arranged concentrically one within the other, lamp-receiving sockets carried by the inner of said shells, the outer of said shells having openings registering with said sockets, and means for detachably securing the inner shell to said basic portion.

2. In a cluster or plural lamp socket, a basic or supporting part, a plurality of lamp-receiving shells, means for supporting said shells and electrically connecting the same together, interlocking means for detachably connecting said last-named means with said basic part, a casing carried by said lamp-receiving shells having lamp openings registering with said shells, insulating bushings interposed between each of said shells and the casing, and means adapted to complete the circuit through the lamps when said shell-supporting member is attached to said supporting part.

3. In a plural or cluster lamp socket, the combination with a basic or supporting part, of center lamp-engaging contacts carried thereby and a contact plate comprising a bowl-shaped shell detachably connected therewith having openings to permit the lamps to engage said center contacts.

4. In a plural or cluster lamp socket, the combination with a basic or supporting part, of a hemispherical contact plate having openings therein to permit the lamps to engage the center contacts, detachably connected with said basic or supporting part, and a casing carried by and removable with said contact plate.

5. In a cluster or plural lamp socket, a suitable basic or supporting part, lamp supporting means detachably connected with said basic or supporting part, a circular metallic casing having lamp openings carried by said lamp supporting means, registering center contacts suitably inclosed by said casing, and binding posts suitably disposed within said casing and adapted to be disclosed by the detachment of said casing and lamp supporting means.

6. The combination with a suitable basic or supporting part, of a circular contact plate detachably connected peripherally therewith and having suitable lamp supporting means, a cover or casing carried by said lamp supporting means, registering center contacts inclosed by said casing, binding posts suitably mounted within said casing and disclosed by the removal of said casing and contact plate, and detachable means for establishing communication between one of said binding posts and said contact plate.

7. In a plural or cluster lamp socket, the combination of a series of sockets radially disposed, a single socket disposed axially with relation to said series of sockets, means for supporting said sockets and electrically connecting the same with each other, a center contact for said axially disposed socket, a binding-post for said contact, center contacts for said series of sockets, and a binding-post common to all of said last-named contacts.

8. In a plural or cluster lamp socket, the combination of a series of sockets arranged in a circle, a single socket centrally disposed relatively to said series of sockets, means for supporting said sockets and electrically connecting the same together, a center contact for said centrally disposed socket, means for connecting a lead with said contact, a center contact for each of said series of sockets, said last-named contacts being electrically connected together, and means for connecting a lead with said last-named contacts.

9. In a plural or cluster socket, the combination of a base, a series of sockets arranged in a circle, a centrally disposed socket, center contacts for said series of sockets, said contacts being carried by said base, means for connecting said contacts with a source of current supply, a center contact for said centrally disposed socket, and means for independently connecting said last-named contact with a source of current supply.

10. In a plural or cluster socket, the combination of a series of sockets arranged in a circle, a centrally disposed socket, center contacts for said series of sockets, means for connecting said contacts with a source of current supply, a center contact for said centrally disposed socket, and means for independently connecting said last-named contact with a source of current supply.

11. In a plural or cluster socket, the combination of a casing having a series of openings arranged in a circle and a single central opening, means inclosed by said casing for sustaining a lamp in each of said openings, contacts for engaging the terminals of said lamps, means for connecting a plurality of said lamps in circuit with leads, and means for independently connecting the lamp in the central opening in circuit with another lead.

12. In a plural or cluster lamp socket, the combination of a supporting part, a body portion separable therefrom, a series of lamp-holding devices arranged in a circle, a centrally disposed lamp-holding device, contacts for engaging the lamps, permanently organized means for connecting a plurality of said contacts together electrically, a binding-post within said body portion for connecting a lead with said last-named means, and a separate binding-post within said body portion for connecting one of the contacts of the center lamp-holding device with another lead.

13. In a plural lamp socket, a plurality of circularly arranged lamp sockets, a centrally disposed lamp socket, means for connecting together the corresponding contacts of all of said sockets, and means for connecting together the opposite contacts of the circularly arranged sockets, the remaining contact of said centrally disposed socket being isolated.

14. In a plural lamp socket, a plurality of circularly arranged lamp sockets, a centrally disposed lamp socket, a terminal to which one contact of each of said sockets is connected, a second terminal to which the opposite contact of each of the circularly arranged sockets is connected, and a third terminal to which the remaining contact of the centrally disposed socket is connected.

In witness whereof I have hereunto subscribed my name in the presence of two witnesses.

REUBEN B. BENJAMIN.

Witnesses:
P. D. PHILLIPS,
W. MACNAUGHTON.